July 28, 1931.  J. A. LEWIS ET AL  1,816,488
SWAGING APPARATUS
Original Filed March 12, 1926   2 Sheets-Sheet 1
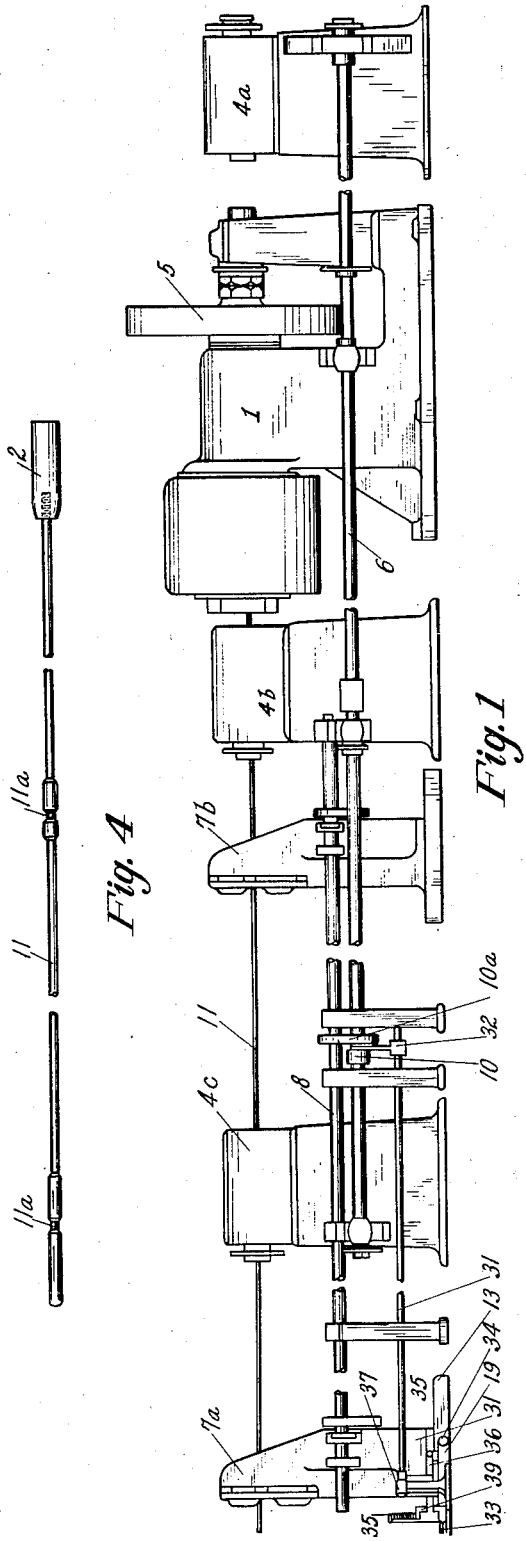
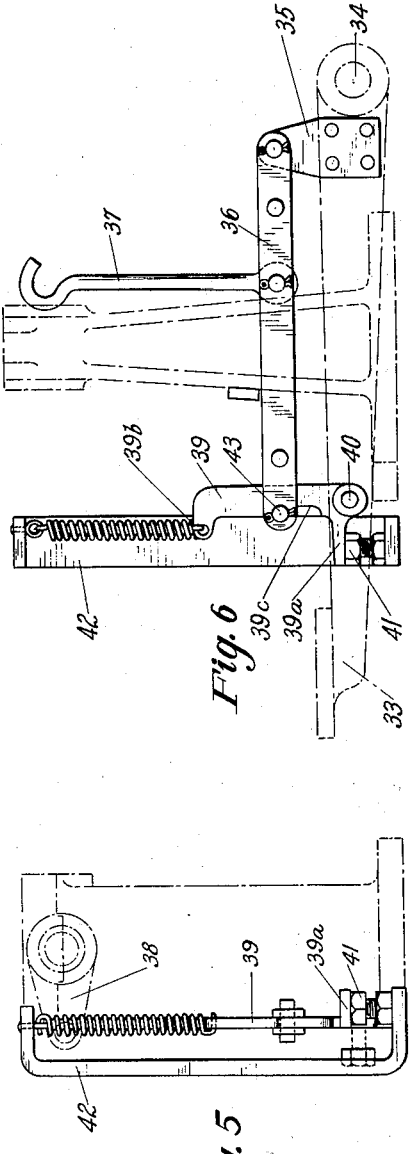
INVENTORS
James A. Lewis
Earl K. Holmes
BY Richey & Watts
ATTORNEYS

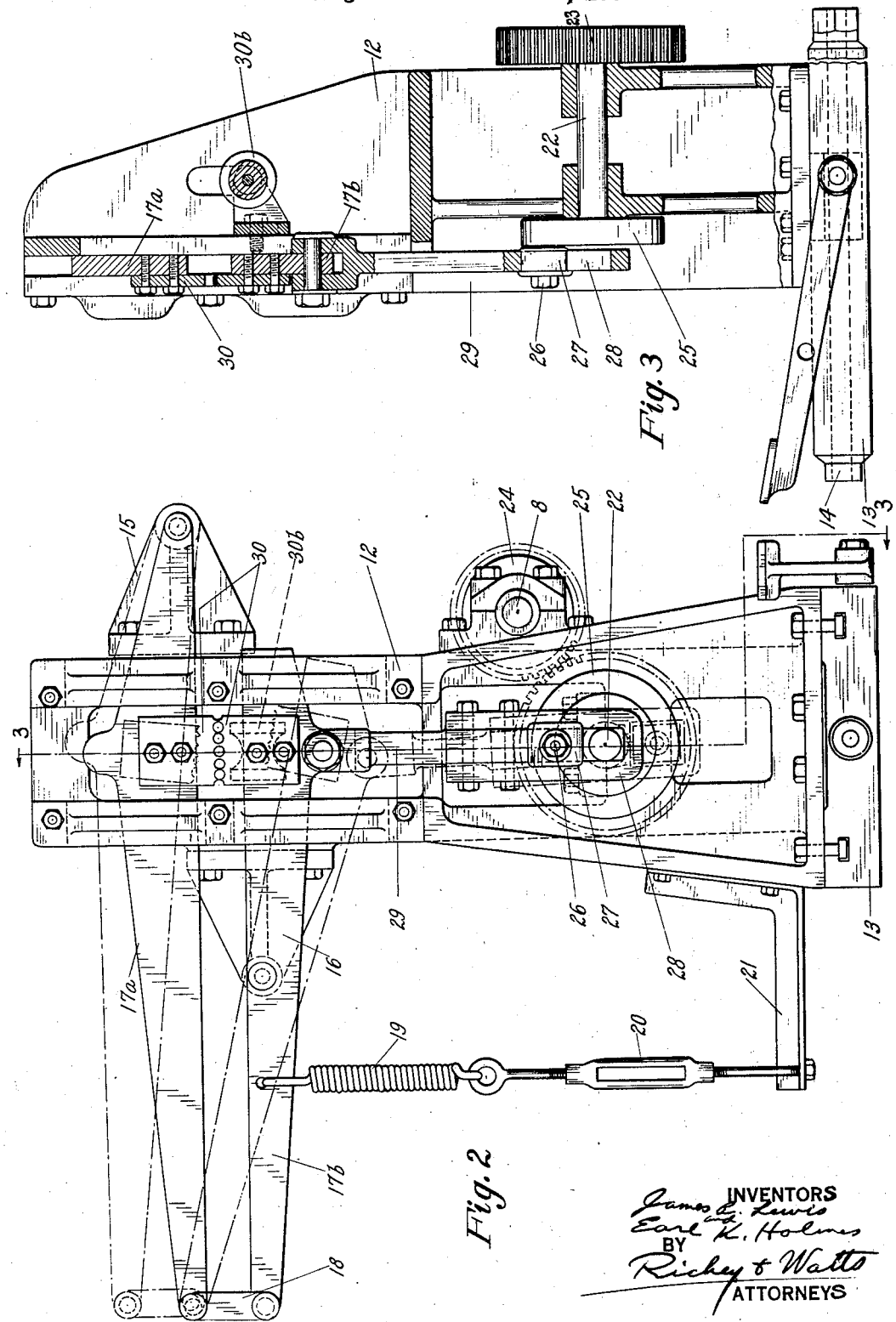

Patented July 28, 1931

1,816,488

UNITED STATES PATENT OFFICE

JAMES A. LEWIS AND EARL K. HOLMES, OF CLEVELAND, OHIO, ASSIGNORS, BY MESNE ASSIGNMENTS, TO STEEL AND TUBES, INC., OF CLEVELAND, OHIO, A CORPORATION OF OHIO

SWAGING APPARATUS

Original application filed March 12, 1926, Serial No. 94,133. Divided and this application filed February 5, 1927. Serial No. 166,062.

This invention relates to the art of metal working and more particularly the swaging of tubes. It also relates to apparatus with which the improved methods may be practiced and a new and improved apparatus for holding a mandrel.

Among the objects of the invention are the provision of a means for holding a mandrel in a predetermined position and for permitting the feeding of lengths of tubing in substantially continuous and end to end abutting relation over the mandrel, such, for instance, as the mandrel of a swaging apparatus.

Other objects will appear and be pointed out in the following specification.

In the drawings attached to this specification and forming a part thereof—

Fig. 1 is a side elevation of one form of apparatus embodying my invention;

Fig. 2 is an end elevation of one of the mandrel rod holding devices shown in Fig. 1;

Fig. 3 is a vertical section taken substantially on line 3—3 of Fig. 2; and

Fig. 4 is an enlarged, fragmentary view of the mandrel and mandrel rod.

Figs. 5 and 6 are respectively end and side elevational views of the tripping mechanism for operating the holders.

This application is a division of our copending application, Serial No. 94,133, filed March 12, 1926.

Heretofore, so far as we are aware, mandrels, especially those for use in the swaging of tubes, have been held in the desired position, by some means such as by a rod in a manner which necessitated removal of the mandrel from the desired position for each article to be passed thereover. In other words, the mandrel was removed from the desired position in a device, such as a swaging die, and after a tube had been passed thereover the mandrel was again placed in the desired position and held by the rod until the tube had passed over the mandrel. This method of holding the mandrel and of swaging was necessarily expensive, first, because slow and, second, because the tube must originally be formed with a sufficiently large inside diameter so as freely to pass over the mandrel on to the rod. The operation was slow because only one tube could be handled at a time, and the apparatus was idle while the mandrel was being removed and replaced by another or reloaded and replaced in position. Since the tubes could only be swaged by passing them over a mandrel preliminary to swaging, a tube which was undersize could not be utilized. In other words, it was difficult to expand a tube efficiently and with the same apparatus as was used in contracting the tube, and was not often done commercially.

By our invention, however, we have overcome these prior disadvantages and are enabled so to hold a mandrel as to maintain it at all times in substantially the position desired, meanwhile passing tubes thereover continuously and in end to end abutting relation if desired, and regardless of whether the tubes are undersize or oversize. Among the direct commercial results of our invention is a saving in the cost of swaging due to the resulting increased production of tubes and a saving in the cost of producing the tubes due to maintaining the tubes, during the manufacture, close to the desired finished dimensions, thereby avoiding the necessity of swaging all but a small percentage of the tubes whose dimensions may be so much undersize or oversize as not to pass inspection.

In the accompanying drawings we have illustrated apparatus by which our improved methods may be carried out. Referring first to Fig. 1 in which we have illustrated tube swaging apparatus embodying our invention, numeral 1 indicates as an entirety a swaging device of conventional form through which a tube passes over a mandrel 2 and within a swaging die (not shown). 4a indicates a puller of conventional form for drawing the tube through the swager 1 and 4b indicates a similar device disposed on the other side of the swager 1 for pushing or feeding tubes to be swaged into the swager 1. An additional feeder 4c similar to feeder 4b is disposed at some distance apart from and in front of feeder 4b considering the direction of travel of tubes to be handled thereby. A source of power (not shown) is connected as by a belt (not shown) to drive wheel 5 on the swager 1. A main drive shaft 6 actuated by swager 1 actuates the feeders 4a, 4b and 4c synchronously. It will be understood that by changing the gearing between the main drive shaft 6 and the mechanism in the various feeders the rate of speed or feeding action of these feeders may be adjusted independently of each other so that one feeder may pass tubes therethrough more rapidly than another. The feeders 4a and 4b are so disposed with respect to each other that one or the other of these devices will always be in feeding engagement with a tube passing through the swager 1.

Between the feeders 4b and 4c is mounted a holding device 7a for holding a mandrel holder such as a rod 11 connected to the mandrel 2. Obviously other mandrel holders such as a chain cable or the like may be employed instead of a rod. In front of the first feeder 4c is mounted another holding device 7b similar in substantially all respects to the holding device 7a. The holding devices 7a and 7b are actuated simultaneously by means of a jack shaft 8 geared to the driving mechanism of each of the holding devices 7a and 7b and connected through a suitable gear and clutch with main drive shaft 6. The construction of the clutch 10 and the tripping mechanism indicated as an entirety at 9 will be described in detail hereinafter but for the present it will be understood that when the tripping device 9 is actuated, the clutch 10 will operatively connect the drive shaft 6 with the jack shaft 8 and cause movement of the rod holding jaw levers of the devices 7a and 7b through one-half of their normal cycle of movement. Since these cycles are spaced 180° apart and since the jaw levers have some lost motion, it will be understood that the rod holding jaw levers of device 7a will be closed in rod holding position about a mandrel carrying rod 11, and then the similar levers of device 7b will be opened. With the holding arms in this open position a tube may be slid over the end of the rod 11 between the jaws of the device 7b and pushed into the feeder 4c. When the tube has passed entirely through the device 7b, the tripping device 9 may again be actuated with resultant closing of the jaws of device 7b about the rod 11 and then separation of the corresponding levers of device 7a. The tube thus fed onto the rod may be passed through the feeder 4c, holder 7a and into feeder 4b, thence between the swaging die 3 and mandrel 2 and on through the swager and puller 4a. As soon as the tube has passed through the holder 7a the tripping device 9 may again be actuated and the foregoing operation repeated. Preferably, the feeder 4c operates at such a speed that a tube will be passed therethrough in time to abut the end of the preceding tube between swager 1 and feeder 4b, thereby producing a substantially continuous and end to end abutting relation of the tubes entering the swager.

Referring now to Figs. 2 and 3, the construction of the holding devices 7a and 7b will be set forth. Since these devices are similar in substantially all respects, only one will be described.

The holding device comprises an upright frame 12 slidably seating on a base 13 and fitted with a screw 14 by which it may be moved back and forth adjustably on the base. At one side near the top of the frame 12 is secured a projecting bracket 15 while a similar bracket 16 is disposed on the opposite side and at a somewhat lower level. A jaw lever 17a is pivoted at one end in the bracket 15 and a similar but somewhat shorter jaw lever 17b is pivoted in the bracket 16. A link 18 connects the ends of the levers 17a and 17b at the ends thereof remote from the frame 12. A spring 19 is secured at one end to the lever 17b and at the other end through a turnbuckle 20 and bracket 21 to a frame 12. The spring 19 serves to position the jaw levers as shown in full lines in Fig. 2.

Plates 12a hold the jaw levers in sliding and positioning engagement with the frame 12. The frame 12 carries a short drive shaft 22 provided at one end with a gear 23 to mesh with a gear 24 on the jack shaft 8 and at the other end a crank wheel 25 having a crank pin 26 eccentrically mounted therein and journaled in a bearing block 27 which is free to move in a yoke 28 forming a part of a connecting rod 29 which joins the jaw lever 17b with the source of power transmitted through the jack shaft 8. It will be understood that rotation of the jack shaft 8 will rotate the crank wheel 25 and move the bearing block 27 in the yoke 28. Since the throw of the pin 26 is greater than the space provided in the yoke 28, the connecting rod 29 will be moved in the frame and the jaw levers opened or closed. For example, with a 5½ inch stroke of the pin 26, a 2½ inch movement of the connecting rod 29 may be attained. The lost motion produced by the yoke 28, block 27 and pin 26 insures substantially continuous holding engagement of the jaw levers 17a and 17b with the mandrel holder, namely rod 11, one set of jaw levers being brought into engagement with the rod 11 before the other set is released from engagement therewith. When the connecting rod 29 is pulled down from the position shown in Fig. 2 the jaw levers 17a and 17b are moved about their respective pivots into substantially the dotted line position of Fig. 3, thereby separating the levers in the frame and moving apart from each other the rod holding jaws 30 carried by each of the jaw levers. The jaws 30 are preferably provided with a plurality of cooperating serrations 30a in their meeting edges of a size suitable to engage with a reduced portion 11a of the mandrel rod 11 to maintain the same against longitudinal movement thereof while permitting rotational movement thereof. When the jaw levers are opened and the jaws 30 separated the rod 11 will be unsupported and in position to receive a tube thereover. A roller 30b adjustably mounted on frame 12 serves to support a tube passing over rod 11.

Preferably the wrist pins 26 of the tube holding devices 7a and 7b are spaced 180° apart so that the jaw levers of one device will be in open position when those of the other are in closed position, thus at all times insuring that the rod 11 will be held against longitudinal movement by one holding device or the other, while permitting a tube to be passed over the rod and through a holder at the same time that a rod is being swaged between the mandrel and die. Preferably the gear 10a on the clutch 10 and the gear 23 on the shaft 22 are of such size or ratio that one revolution of the clutch 10, that is, one half revolution of gear 23 will cause either the opening or the closing of each pair of jaw levers.

The specific means herein shown for producing a single rotation of the jack shaft 8 included a clutch 10 and a tripping device 9, the two devices being interconnected by means of a rod 31. The clutch 10 is so constructed that the main drive shaft 6 rotates freely in the gear 10a except when the release lever 32 is brought out of engagement with the clutch and thereby connecting the gear 10a with the shaft 6 for a single rotation of the shaft 8. The release device 9 is so constructed as to permit withdrawal of the release lever 32 from engagement with the clutch 10, after the jack shaft has made one revolution. This release device 9 comprises a foot lever 33 pivoted on a supporting pin 34 on the base 13. A bracket 35 projects upwardly from the lever 33 near the pin 34 and carries an arm 36 which intermediate its ends is connected through a link 37 to a crank arm 38 which is keyed to the rod 31. The arm 36 is bifurcated or preferably formed of spaced sides, at its forward end at least, to receive an upright lever 39 which is fulcrumed at 40 to the foot lever 33. One end 39a of this lever 39 is adapted in certain positions to engage with an adjustable stop 41 carried by the base 13 and at the other end 39b is connected to a spring carried by a suitable supporting member 42, whereby the lever arm is normally maintained in an upright position. The arm 36 is provided with a pin 43 to move in an elongated recess 39c in the front edge of the lever 39. The levers 32 and 38 are mounted and constructed in such a manner that they tend to rotate the rod 31 so as to maintain lever 32 in contact with clutch 10. In the normal position of rod 31, and lever 32, in contact with clutch 10, the arm 36 is positioned so that the pin 43 rests in the recess 39c of lever 39. When the workman steps on lever 33, pivoting it about the pin 34, the lever 39 is moved downwardly and the upper edge of the recess 39c engages the pin 43 moving the arm 36 downwardly thereby rotating the rod 31 to release the lever 32 with the clutch 10. Continued downward movement of the lever 33 forces the pin 43 out of contact in the recess 39c due partly to the forward movement of arm 36 as the lever 33 pivots about the pin 34 and partly to rearward tilting of the lever 39 as the end 39a thereof engages with the stop 41, thereby pivoting the lever 39 about its pin 40. When the workman removes his foot from lever 33 the spring attached to lever 39 restores the lever 33 to its normal position, and the pin 43 drops into place in the recess 39 as soon as the rod 31 rotates due to its own weight and the weight of levers 32 and 38. In this manner the clutch 10 is actuated to cause a single rotation of shaft 8 with each downward movement of lever 33 and this results in half a cycle of movement of the mandrel holding jaws of the devices 7a and 7b.

Having thus described our invention so that those skilled in the art may be able to practice the same, what we desire to secure by Letters Patent is defined in what is claimed.

We claim:

1. In tube swaging apparatus, the combination, with a holding device for a mandrel rod, said holding device including jaws for gripping the mandrel rod, of means for operating the jaws, said means comprising a jack shaft, levers operatively connected to the jaws, a connecting rod operatively associated with the levers, and a shaft driven by the jack shaft for operating the connecting rod.

2. Swaging apparatus comprising, in combination, a mandrel, a mandrel supporting rod, devices for feeding tubes over the mandrel, a pair of holding means spaced apart and including jaws operable to grip the mandrel supporting rod, means for operating the jaws and a jack shaft for driving the jaw operating means, said jack shaft being driven from the same power source that drives the feeding devices.

3. In tube swaging apparatus, the combination, with a holding device for a mandrel rod, said holding device including jaws for gripping the mandrel rod, of means for operating the jaws, said means comprising a jack shaft, levers operatively connected to the jaws, a connecting rod operatively associated with the levers, a shaft driven by the jack shaft for operating the connecting rod, and a clutch device for setting up and discontinuing driving action on the part of the said shaft.

4. Apparatus of the class described, comprising, in combination, a pair of jaws adapted to grip a mandrel supporting rod, a pair of levers, each lever carrying one of the jaws, each lever having one end pivotally mounted to the framework of the machine with the free ends of the levers connected by a link, spring means normally maintaining the levers in a certain position, and a connecting rod operatively associated with the jaws.

5. Apparatus of the class described, comprising in combination, a pair of jaws adapted to grip a mandrel supporting rod, a pair of levers, each lever carrying one of the jaws, each lever having one end pivotally mounted to the framework of the machine with the free ends of the levers connected by a link, spring means normally maintaining the levers in a certain position, a connecting rod, a shaft, a crank shaft connection between the shaft and rod whereby reciprocating motion is imparted to the connecting rod upon rotation of the shaft, and a jack shaft for driving said last mentioned shaft.

In testimony whereof we hereunto affix our signatures this 2nd day of February, 1927.

JAMES A. LEWIS.
EARL K. HOLMES.